United States Patent [19]
Williams

[11] Patent Number: 5,470,099
[45] Date of Patent: Nov. 28, 1995

[54] ONE-PIECE STEERING WHEEL ASSEMBLY

[75] Inventor: Duane D. Williams, Beavercreek, Ohio

[73] Assignee: General Motors Corporation, Detroit, Mich.

[21] Appl. No.: 143,890

[22] Filed: Nov. 1, 1993

[51] Int. Cl.⁶ .................................................. B60R 21/16
[52] U.S. Cl. ...................... 280/728.2; 280/731; 74/552; 403/326; 403/386; 411/512; 411/353
[58] Field of Search ........................... 280/728 A, 728 B, 280/731, 728.2, 728.3; 74/552; 403/326, 327, 386, 384; 411/353, 352, 348, 512

[56] References Cited

U.S. PATENT DOCUMENTS

| | | | |
|---|---|---|---|
| 3,641,834 | 2/1972 | Barenyi | 74/552 |
| 3,984,126 | 10/1976 | Goetz et al. | 280/731 |
| 4,721,008 | 1/1988 | Stoops et al. | 74/552 |
| 4,934,735 | 6/1990 | Embach | 280/731 |
| 4,995,638 | 2/1991 | Shinto et al. | 280/731 |
| 5,188,000 | 2/1993 | Kaga | 74/552 |
| 5,265,905 | 11/1993 | Shelton | 280/731 |
| 5,350,190 | 9/1994 | Szigethy | 280/731 |

FOREIGN PATENT DOCUMENTS

| | | | |
|---|---|---|---|
| 4035975 | 5/1992 | Germany | 280/728 B |
| 2242871 | 10/1991 | United Kingdom | 280/731 |

Primary Examiner—Margaret A. Focarino
Assistant Examiner—Paul N. Dickson
Attorney, Agent, or Firm—Charles E. Leahy

[57] ABSTRACT

A method and steering wheel assembly having a steering wheel comprising a preselected material continuously molded onto at least a driver's side thereof to conceal the air bag when the air bag is mounted to the steering wheel. The preselected material covers at least a driver's side of a rim section, a center section and a spoke section which joins the rim and center sections. The invention provides an integral construction which permits a steering wheel manufacturer to provide a steering wheel having a continuous molded construction on at least a driver's side thereof. This also enables steering wheels to be manufactured in a variety of shapes and sizes.

21 Claims, 2 Drawing Sheets

ONE-PIECE STEERING WHEEL ASSEMBLY

BACKGROUND OF THE INVENTION

1. Field of the Invention

This invention relates generally to a supplemental inflatable restraint and, more particularly, to a method and apparatus for providing a one-piece steering wheel pad assembly for use with an air bag.

2. Description of Related Art

In the past, supplemental inflatable restraints have been incorporated into the steering wheels of automobiles in order to protect the driver of the automobile in the event of a collision. In addition, supplemental inflatable restraints have also been incorporated into the dashboard of automobiles in order to protect the front seat passenger. Conventional supplemental restraints comprise a separate restraint module which houses an inflatable air bag and inflator. The module further includes a pad or door portion covering the front portion of the module and which is adapted to open and permit deployment of the air bag.

The restraint module was a separate module which was mounted generally in the center of the driver's side of a steering wheel after the steering wheel was mounted to a steering column. The restraint module typically had a molded cover. The steering wheel also had a rim and support spokes which had a molded cover. It was not uncommon to find, for example, that the color or gloss of the molding of the cover of the restraint module was different from the color or gloss of the molded cover on the steering wheel. In addition, because the restraint module and steering wheel were molded separately, there would invariably be some gaps between, for example, the molding of the restraint module and the molding on the spokes of the steering wheel when the restraint module was mounted to the steering wheel. These gaps were difficult to eliminate and also were aesthetically unpleasing. Accordingly, it is desirable to provide a steering wheel having a one-piece molded cover for use with an air bag.

SUMMARY OF THE INVENTION

It is therefore a primary object of the present invention to provide a steering wheel having a preselected material continuously molded on at least a driver's side thereof, thereby providing an integral covering surface molded on the steering wheel to provide a continuous molded appearance.

In one aspect, this invention comprises a steering wheel for use with an air bag, comprising a steering wheel core comprising a center section; a rim section, and a plurality of spokes joining the center and rim sections to provide a driver's side and a mounting side, said center section comprising a receiving area which is capable of receiving an air bag; a preselected material formed as an integral covering surface extending over the rim section, the center section and the spoke section; and a fastener associated with the mounting side for fastening the center section onto a steering column.

In another aspect, this invention provides a method for producing a steering wheel having an air bag and a continuous molded material on a driver's side thereof, comprising (a) providing a rim section, a center section and a spoke section joining the rim and center sections, the steering wheel also comprising a mounting side located opposite the driver's side and a continuous molded material on at least the driver's side; and (b) mounting an air bag module to the center section on the mounting side of the steering wheel.

In yet a further aspect, this invention comprises a steering wheel for use with an air bag; a steering wheel having a driver's side and a mounting side, the mounting side comprising a receiving area which is capable of receiving the air bag; mounting means for mounting the air bag in the receiving area; a preselected material continuously molded onto at least the driver's side and over the receiving area to conceal the air bag when the air bag is mounted therein; and a fastener associated with the mounting side for fastening the steering wheel to a steering column.

These and other objects and advantages of the invention will be apparent from the following description, the accompanying drawing, and the appended claims.

DESCRIPTION OF THE PREFERRED EMBODIMENT

Figure 1:
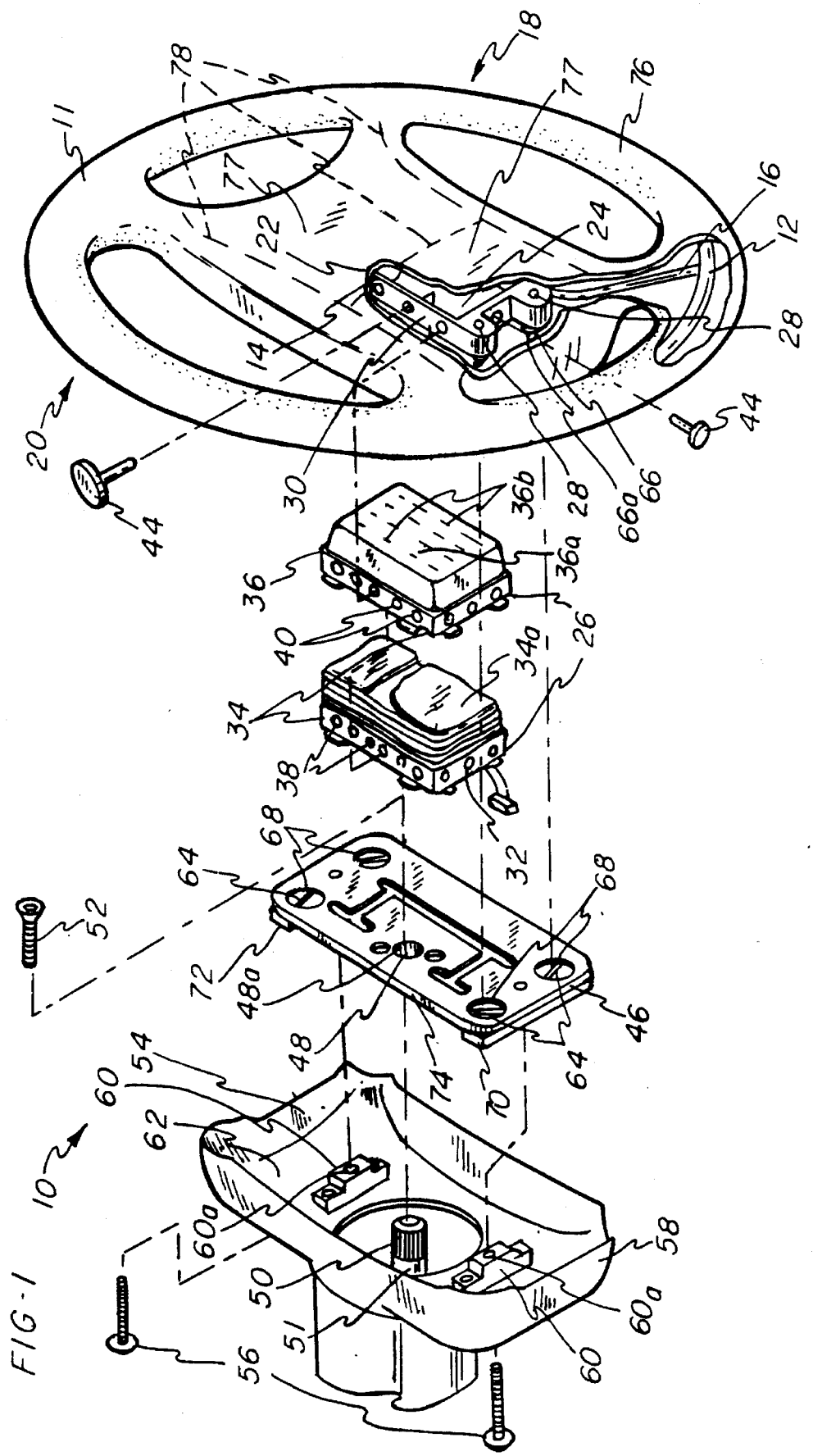
FIG. 1 is an exploded perspective view of the steering wheel according to one embodiment of this invention.
Figure 2:
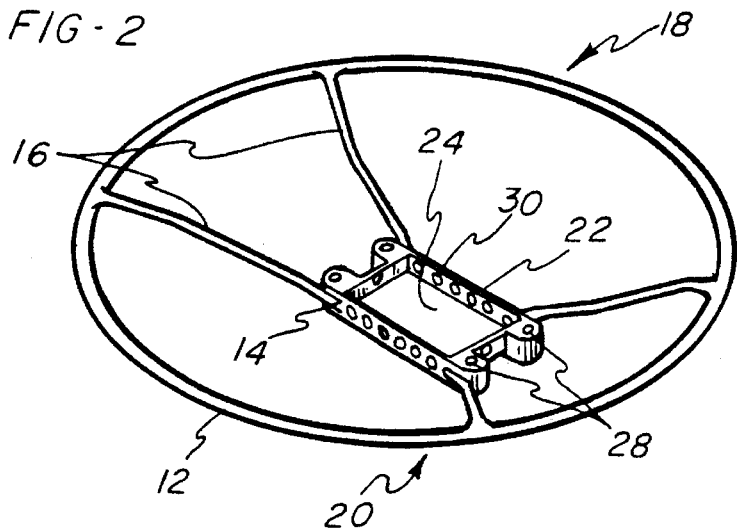
FIG. 2 is a view of a driver's side of a steering wheel rim on which a preselected material is molded.

Referring to FIG. 1 of the drawing, an exploded perspective view of a steering wheel assembly 10 is shown. The steering wheel assembly 10 comprises a steering wheel 11 comprising a rim section 12, a center section 14, and a plurality of spokes 16 for joining the center and spoke sections 12 and 14 to provide a driver's side 18 and a mounting side 20 as best shown in FIG. 2. In the embodiment being described, the rim section 12, plurality of spokes 16 and the center section 14 may be manufactured from die cast magnesium. It is to be noted, however, that the rim section 12 and spokes 16 may be made from steel or any other suitable material.

The center section 14 comprises a wall member 22 which defines a receiving area 24 which is capable of receiving an air bag module 26 (FIG. 1). The wall member 22 comprises a plurality of locating apertures 28 whose function is described below. The wall member 22 also comprises a plurality of securing apertures 30 for securing the air bag module 26 thereto. In the embodiment shown in FIG. 1, the wall member defines a generally rectangular receiving area 24, but it should be appreciated that the wall member 22 could define a receiving area 24 having any predetermined shape or configuration.

The air bag module 26 comprises an air bag support 32 for supporting an air bag assembly 34 which is conventionally fastened thereto. The air bag assembly 34 typically comprises an inflater (not shown), an air bag 34a and air bag support 32. The air bag module 26 also comprises a container 36 for receiving the air bag assembly 34. The air bag support 32 and container 36 have a plurality of securing apertures 38 and securing apertures 40, respectively. In the embodiment being described, the container 36 and air bag support 32 may be positioned in the receiving opening 24 such that the securing apertures 38, 40 and 30 become generally aligned. Mounting means are provided for mounting the air bag 34, air bag support 32, container 36 and air bag module 26 in the receiving opening 24. In the embodiment being described, mounting means could be a screw or rivet 44 to fasten the air bag module 26 in the receiving opening 24. It should be appreciated that although mounting means is shown as a screw or rivet 44, it could be a weld, braze, an integral molding, or any other suitable means or method for mounting or securing the air bag module 26, air bag 34a, air bag support 32, and container 36 in the receiving area 24.

It is to be noted that the container 36 comprises a deployment surface 36a having a plurality of lines of weakness 36b. The lines of weakness 36b facilitate enabling the deployment surface 36a to be ruptured or penetrated to permit the air bag assembly 34 to be deployed. A support plate 46 comprises an aperture 48 which has a plurality of splines 48a. The splines 48a cooperate with a plurality of splines 50 on a steering column 51 to cause the support 46 to be firmly and rigidly secured thereto. A screw 52 is screwed into the threaded opening 54 in the steering column 51 to facilitate securing the support 46 to the column 51.

A bottom cover or shroud 58 may also be mounted to the steering column 51. In the embodiment being described, the shroud 58 comprises a plurality of spacers 60 which cooperate to space the support 46 a predetermined distance away from a surface 62 of cover 58. In the embodiment being described, a plurality of screws 56 are inserted through openings 60a and into a corresponding threaded female opening (not shown), thereby securing the lower shroud 58 to the support 46.

Figure 3:
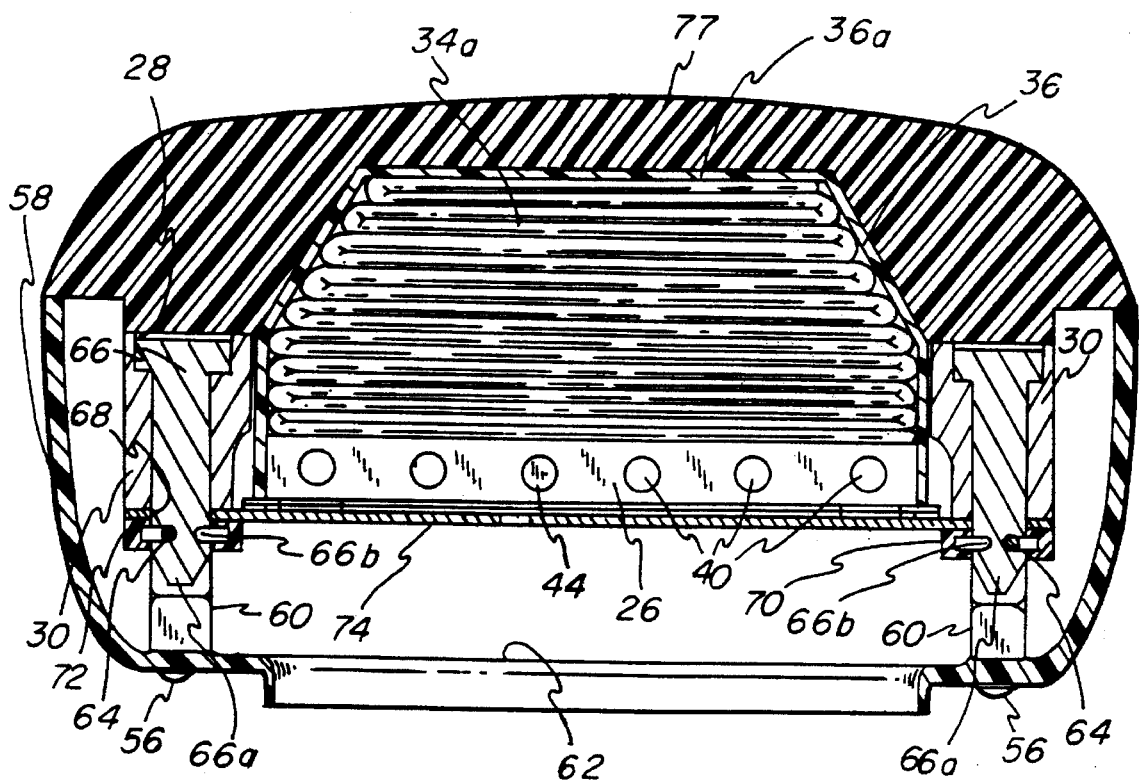
FIG. 3 is a view, partly broken away and in section, of the steering wheel after it is assembled.

As best shown in FIG. 3, a fastener or a plurality of mounting members 66 are first received in the locating apertures 28. The support 46 (FIG. 1) is formed with a plurality of apertures 68 corresponding in number and location to the number and location of mounting members 66, whereby the apertures 68 are disposed to receive the distal ends 66a of the mounting members 66 therethrough. The operation and construction of the support 46 and mounting members 66 is similar in concept to the structures shown in and (U.S. Pat. No. 5,380,037), U.S. Pat. No. 5,333,897 which are assigned to the same assignee as the present invention and which are hereby incorporated by reference and made a part hereof.

A pair of spring housings 70 and 72 are mounted to a rear face 74 of support 46. The spring housings 70 and 72 each include a spring 64 which has ends which are resiliently biased toward openings 68. Each of the spring housings 70, 72 are adapted to house the elongated spring 64 wherein each spring extends between a pair of apertures 68. In addition, opposing ends of each of the springs 64 are positioned such that they traverse across respective apertures 68 in order to ensure that the springs 64 contact the mounting members 66 as the center section 14 is moved into association with the support 46. Further, the springs 64 are preferably formed of a resilient material such as music wire, whereby the springs 64 are resiliently yieldable in a lateral direction, transverse to the longitudinal axis of mounting members 66 in order to permit insertion of mounting members 66 through apertures 68 and past springs 64, which movement is facilitated by the tapered configuration of the distal ends 66a. The spring housings 70 and 72 are mounted to support 46 by conventional means, such as a screw (not shown).

Thus, when the mounting members 66 are moved in a first direction toward the support 46 and through the apertures 68, the spring 64 will move laterally outwardly until they are aligned with the slots 66b, at which time the spring 64 will move laterally inward into contact with the slots 66b. In this position, the springs 64 prevent the mounting members 66 from moving in a second direction out of the apertures 68, whereby the center section 14 is held in operative relationship to the support 46. As best shown in FIG. 3, the dimension of the slots 66b in a direction parallel to the direction of the longitudinal axis of mounting member 66 is greater than the dimension of the springs 64 in the same direction to thereby permit a limited predetermined amount of movement of the center section 14 relative to the support 46.

If it is desired to separate center section 14 from the support 46, a screw driver (not shown) may be inserted through apertures (not shown) in a rear portion of the lower shroud 58 and into the spring housings 70 and 72, wherein the blade (not shown) of the screw driver may then be rotated. The rotation of the screw driver blade located within the spring housings 70 and 72 causes the blade to contact an end of the spring 64 to thereby bias the spring 64 laterally outward and out of engagement with the slot 68. In this manner, the mounting members 66 are released to move out of engagement with the support 46.

The steering wheel 11 also comprises a preselected material 76 which is continuously molded on at least the driver's side 18 (FIG. 2) defined by the rim section 12, center section 14, and spoke sections 16. The preselected material 76 is molded in one piece and extends over the rim section 12, center section 14, and spoke sections 16 to provide a one-piece construction. Notice also that the preselected material 76 extends over the receiving area 24 so as to conceal the air bag module 26 and air bag assembly 34 when the air bag module 26 and air bag assembly 34 are mounted in receiving opening 24. As best illustrated in FIG. 1, the preselected material 76 comprises weakness area 77 having at least one line of weakness 78 for facilitating the deployment of the air bag assembly 34 through the container 36 and preselected material 76 as the air bag assembly 34 inflates. In the embodiment being described, the molded material 76 is urethane foam, but it could be any suitable material which is capable of being integrally formed or molded into one continuous piece on at least a driver's side 18 of steering wheel 11.

Advantageously, the method and apparatus of the embodiment being described facilitates providing a steering wheel 11 having a preselected material 76 molded in one continuous piece on at least a driver's side 18. This feature eliminates or reduces the necessity of matching, for example, the color or gloss of the molded material of an inflatable restraint module (not shown) with the material molded on the rim (not shown) of the steering wheel.

A method for producing the steering wheel 11 having the air bag assembly 34 and the continuous molded material 76 on the driver's side 18 will now be described. The method for producing comprises the steps of providing a rim section 12, a center section 14, and a spoke section 16 which joins the rim and center sections 12, 14 respectively, to define the driver's side 18 and the mounting side 20 with the preselected material 76 continuously molded on at least the driver's side 18.

The method further includes the step of mounting the air bag module 26 in the receiving area 24 into the center section 14. Once the steering wheel 11 is assembled with air bag module 26 in the manner described, it may then be mounted onto a support plate 46 located on the steering column 51.

When assembling the air bag module 26 with the center section 14, it may be desirous to mount the air bag container 36 to the center section 14 before material 76 is molded. The air bag support 32 and air bag assembly 34 may then be mounted to the air bag container 36.

Before mounting the center section 14 to support plate 46, it may be desirous to mount the support plate 46 to steering column 51 in the manner described above. Once support plate 46 is securely fastened to steering column 51, the center section 14 may be mounted thereto as described above. In doing so, it is desirous to position the center section 14 such that the plurality of mounting members 66 become aligned with the openings 68 so that the center section 14 may be moved in the first direction toward the steering column 51 until the plurality of mounting members are received in their respective apertures 68 until they engage the springs 64 to firmly and rigidly secure center section 14 to support plate 46.

Advantageously, it should be apparent that the present invention provides an apparatus and method for enabling a steering wheel to have a one-piece molded construction on at least a driver's side 18 thereof. Further, it is also contemplated that one or more of the rim section 12, center section 14 or spoke section 16 may be eliminated by providing a rim section 12, center section 14 and spoke section 16 integrally formed as part of the preselected material 76. In addition, although not shown, it may be desirous to mold the air bag container 36 as part of the center section 14 in a one-piece construction. The design features of the present invention also enable steering wheels to be configured and molded in one integral piece on at least the driver's side 18, thereby enabling the producer to be able to easily provide automobile customers a greater variety of steering wheel shapes and designs.

While the forms of the apparatus and method herein described constitute preferred embodiments of the invention, it is to be understood that this invention is not limited to these precise forms of apparatus and that changes may be made therein without departing from the true spirit and scope of the invention which is defined in the appended claims.

What is claimed is:

1. A steering wheel for use with an air bag, comprising:
   a steering wheel core comprising a center section, a rim section, and a plurality of spokes joining said center and rim sections to provide a driver's side and a mounting side, said center section comprising a receiving area which is capable of receiving an air bag;
   a preselected material formed as an integral covering surface extending over said rim section, said center section and said spoke section; and
   a fastener associated with said mounting side for fastening said center section onto a steering column.

2. The steering wheel as recited in claim 1 wherein said center section comprises a wall member which defines said receiving area.

3. The steering wheel as recited in claim 2 wherein said wall member comprises a plurality of locating apertures, said fastener comprising a plurality of mounting members which are operatively positioned in said plurality of locating apertures.

4. The steering wheel as recited in claim 1 wherein said steering wheel comprises a container for receiving the air bag.

5. The steering wheel as recited in claim 2 wherein said steering wheel comprises a container mounted to said wall member in said receiving area, said container being capable of receiving said air bag.

6. The steering wheel as recited in claim 5 wherein said preselected material comprises at least one line of weakness for facilitating the deployment of the air bag through said preselected material.

7. A steering wheel for use with an air bag, comprising:
   a steering wheel core comprising a center section, a rim section, and a plurality of spokes joining said center and rim sections to provide a driver's side and a mounting side, said center section comprising a receiving area which is capable of receiving an air bag;
   a preselected material formed as an integral covering surface extending over said rim section, said center section and said spoke section; and
   a fastener associated with said mounting side for fastening said center section onto a steering column;
   said steering column comprising a support plate mounted thereto;
   said support plate comprising a plurality of resilient detents; and
   said fastener comprising a plurality of mounting members which cooperate with said resilient detents to fasten said center section to said support plate.

8. A method for producing a steering wheel assembly having a steering wheel with an air bag and a continuous molded material on a driver's side thereof, comprising:
   (a) providing a rim section, a center section and a spoke section joining said rim and center sections to provide a steering wheel comprising a mounting side located opposite a driver's side and a continuous integral molded material on at least said driver's side of said steering wheel to provide continuous gap-free covering of the rim, center and spoke sections; and
   (b) mounting an air bag module to the center section on said mounting side of said steering wheel.

9. The method as recited in claim 8 wherein said method further comprises the step of:
   (c) mounting said steering wheel onto a support plate located on a steering column.

10. The method as recited in claim 8 wherein said step (a) further comprises the steps of:
    (a) (1) mounting an air bag container to said center section;
    (a) (2) mounting said air bag in said air bag container.

11. The method as recited in claim 9 wherein said continuous molded material comprises a weakness area through which said air bag may deploy as it inflates; said step (c) further comprising the steps of:
    (c) (1) mounting a support plate onto said steering column;
    (c) (2) mounting said center section to said support plate.

12. A method for producing a steering wheel assembly having a steering wheel in an air bag and a continuous molded material on a driver's side thereof, comprising:
    (a) providing a rim section, a center section and a spoke section joining said rim and center sections, said steering wheel also comprising a mounting side located opposite said driver's side and a continuous molded material on at least said driver's side; and
    (b) mounting an air bag module to said center section on said mounting side of said steering wheel; said method further comprising the step of:
    (c) mounting said steering wheel onto a support plate located on a steering column;
    said continuous molded material comprising a weakness area through which said air bag may deploy as said air bag inflates;

said step (c) further comprising the steps of:

(c)(1) mounting said support plate onto said steering column;

(c)(2) mounting said center section to said support plate;

said center section comprising a plurality of mounting members, said support plate comprising a plurality of apertures for receiving said plurality of mounting members; said plurality of apertures each having a resilient detent associated therewith, said step (c)(2) further comprising the steps of:

(c)(2)(i) positioning said center section such that said plurality of mounting members become aligned with said plurality of apertures;

(c)(2)(ii) moving said center section towards said steering column such that each of said plurality of mounting members are received in one of said plurality of apertures until each of said plurality of mounting members engages one of said resilient detents.

13. A steering wheel for use with an air bag, comprising:

a steering wheel having a driver's side and a mounting side, said mounting side comprising a receiving area which is capable of receiving an air bag;

mounting means for mounting said air bag in said receiving area;

a preselected material continuously molded onto at least said driver's side and over said receiving area to conceal said air bag when said air bag is mounted therein; and a fastener associated with said mounting side for fastening said steering wheel to a steering column.

14. The steering wheel as recited in claim 13 wherein said steering wheel comprises a steering wheel core comprising a center section, a rim section, and a plurality of spokes joining said center and rim sections, said center section comprising a wall member which defines said receiving area.

15. The steering wheel as recited in claim 14 wherein said fastener comprises a plurality of mounting members associated with said center section.

16. The steering wheel as recited in claim 13 wherein said preselected material comprises a weakness area having at least one line of weakness, said weakness area becoming generally associated with said air bag when said air bag is positioned in said receiving area.

17. The steering wheel as recited in claim 14 wherein said preselected material forms an integral covering extending over said rim section, said center section and said spoke section.

18. A steering wheel for use with an air bag, comprising:

a steering wheel having a driver's side and a mounting side, said mounting side comprising a receiving area which is capable of receiving an air bag;

mounting means for mounting said air bag in said receiving area;

a preselected material continuously molded onto at least said driver's side and over said receiving area to conceal said air bag when said air bag is mounted therein;

a fastener associated with said mounting side for fastening said steering wheel to a steering column;

said steering column comprising a support plate;

said support plate comprising a plurality of resilient detents;

said fastener comprising a plurality of mounting members which cooperate with said resilient detents to fasten said steering wheel to said support plate.

19. A steering wheel for use with an air bag, comprising:

a steering wheel having a driver's side and a mounting side, said mounting side comprising a receiving area which is capable of receiving an air bag;

mounting means for mounting said air bag in said receiving area;

a preselected material continuously molded onto at least said driver's side and over said receiving area to conceal said air bag when said air bag is mounted therein; and a fastener associated with said mounting side for fastening said steering wheel to a steering column;

said steering column comprising a support plate;

said support plate comprising a plurality of resilient detents;

said fastener comprising a plurality of mounting members which cooperate with said resilient detents to fasten said steering wheel to said support plate;

said steering wheel comprising a center section having a wall member which defines said receiving area for receiving said air bag, said wall member comprising a plurality of locating apertures, each of said plurality of mounting members being positioned in said plurality of locating apertures so that said plurality of mounting members become generally aligned with said plurality of resilient detents when said steering wheel is positioned in mounting relationship with said support plate.

20. The steering wheel as recited in claim 19 wherein said steering wheel further comprises a container mounted to said wall member in operative relationship with said receiving area, said container being capable of receiving the air bag.

21. A steering wheel for use with an air bag and steering column comprising, a steering wheel core having a center section, a rim section, and a plurality of spokes joining said center and rim sections to provide a driver's side and a mounting side, said center section having a wall member defining a receiving area open toward the mounting side for receiving an air bag and open toward the driver side to enable deployment of the air bag toward the driver;

a preselected material formed as an integral gap-free covering surface extending over said rim section, said center section and said spoke section so that the air bag receiving area is concealed behind the preselected material, said covering surface having an area of weakness overlying the air bag receiving area to enable deployment of the air bag therethrough toward the driver; and and a fastener associated with said mounting side for fastening said steering wheel onto the steering column.

* * * * *